April 12, 1966  R. C. TALBOT ET AL  3,245,513
INVERTER FOR COOKIES AND THE LIKE
Filed Dec. 9, 1963  3 Sheets-Sheet 1
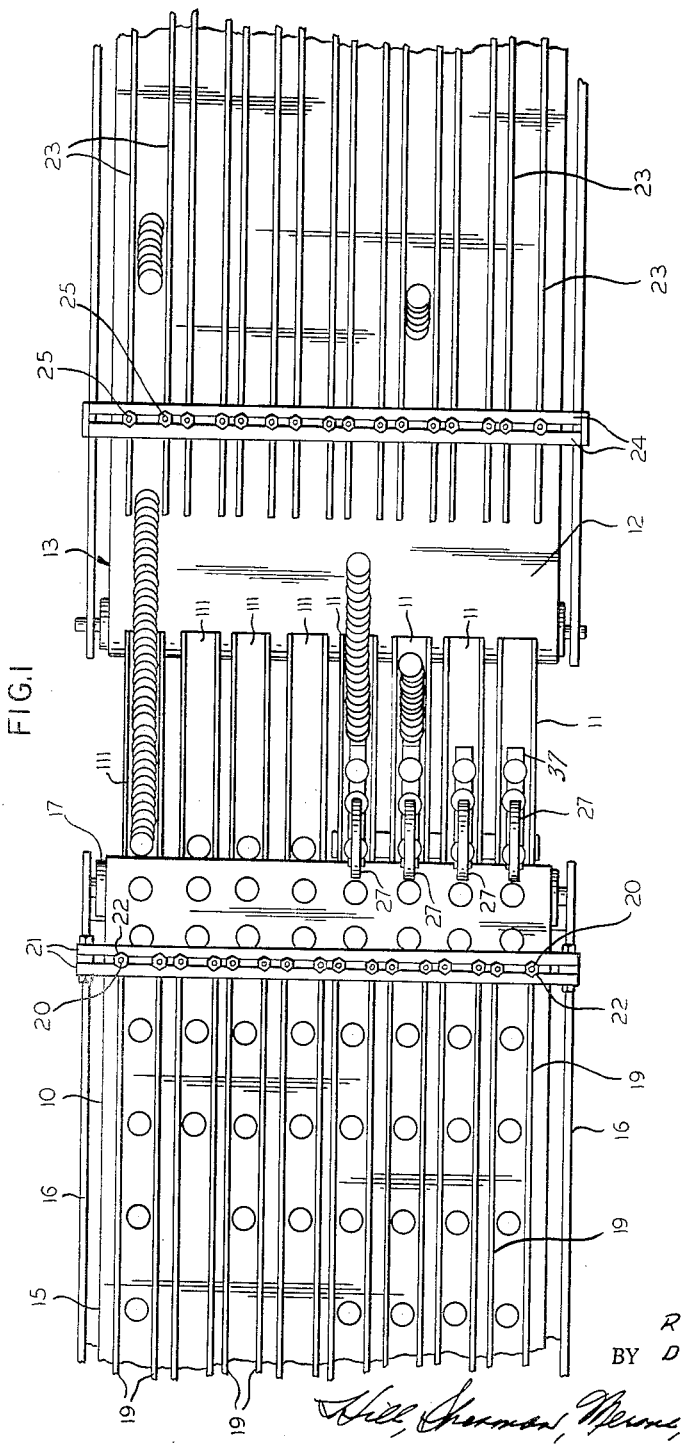
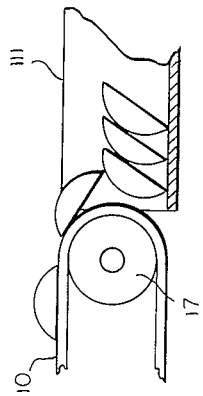
FIG.4
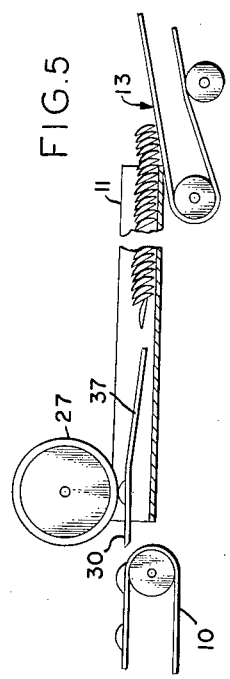
FIG.5
INVENTORS
RICHARD C. TALBOT
BY DAVID E. WEBER
ATTORNEYS

INVENTORS
RICHARD C. TALBOT
DAVID E. WEBER

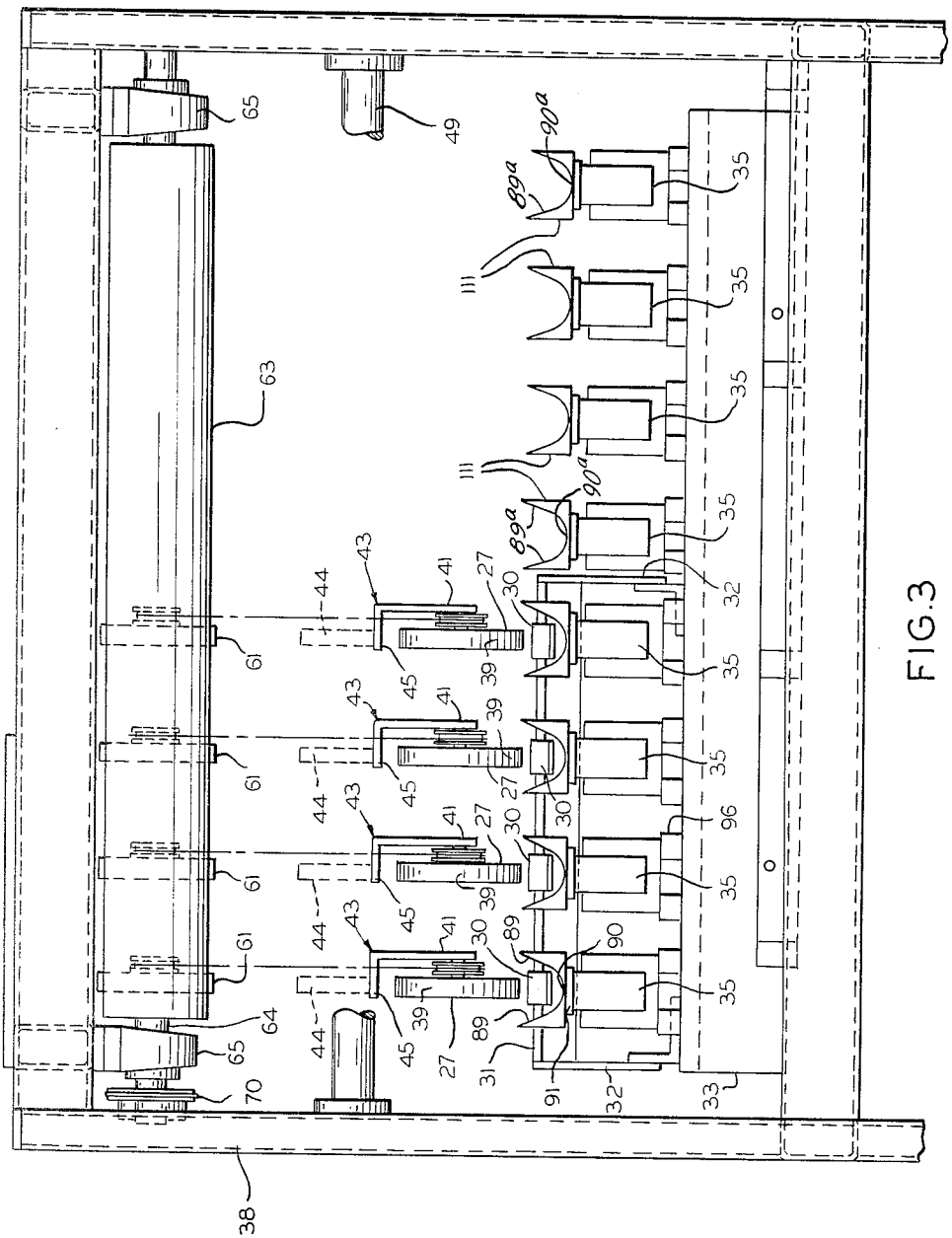

United States Patent Office 3,245,513
Patented Apr. 12, 1966

3,245,513
INVERTER FOR COOKIES AND THE LIKE
Richard C. Talbot, Skokie, and David E. Weber, Chicago, Ill., assignors to Peters Machinery Company, Chicago, Ill., a corporation of Illinois
Filed Dec. 9, 1963, Ser. No. 328,852
6 Claims. (Cl. 198—33)

This invention relates to improvements in apparatus for taking cookies from a conveyor in rows and stacking certain rows of cookies design side leading and certain other rows of cookies design side trailing.

Cookies baked in commercial bakeries are usually conveyed from a baking oven and deposited upon a conveyor in staggered relation with respect to each other along the top surface of the conveyor.

The staggered cookies are then converged into a reduced number of rows and stacked for packaging or sandwiching prior to packing, as shown and described in an application filed by Richard C. Talbot and Fred Rieg on August 31, 1963, Serial No. 304,035, and entitled "Converger and Stacker for Cookies and the Like." Where it is desired to take two cookies or rows of cookies and make sandwiches from the cookies with an icing therebetween, the sandwiching operation is greatly facilitated when one row of certain rows of cookies is conveyed for sandwiching design side leading and another row or certain other rows of cookies is conveyed for sandwiching design side trailing.

A principal object of the present invention is to provide a novel and improved apparatus for taking cookies converged into rows and stacking certain of the cookies with one side leading and certain other of the cookies the same side trailing.

A still further object of the invention is to provide a simple and improved apparatus for stacking cookies in rows with certain rows design side leading and certain other rows design side trailing by conveying the cookies in rows to a discharge station and giving an impelling action to the cookies that are to be stacked design side leading.

A still further object of the invention is to provide an improved form of apparatus for effecting the stacking of certain rows of cookies from a discharge conveyor one side leading, and certain other cookies with the opposite side leading in which the cookies are stacked by vibratory stacker troughs having half round bottoms cooperating with a delivery conveyor, and the cookies stacked with the side leading, which is the up side on the conveyor, pass along slides or fingers extending along the vibratory stacker troughs and are impelled by impelling rollers spaced above the fingers to kick the cookies forward onto the troughs beneath the stacked cookies thereon with the design side facing upwardly.

These and other objects of the invention will appear from time to time as the following specification proceeds and with reference to the accompanying drawings wherein:

FIGURE 1 is a fragmentary plan view of an inverter and stacker constructed in accordance with the principles of the present invention showing the discharge end portion of the conveyor, conveying cookies in rows to the inverter and stacker, and showing the receiving end portion of the coveyor conveying the stacked cookies to the packaging or sandwiching machine;

FIGURE 3 is a transverse sectional view taken substantially along line III—III of FIGURE 1 with certain parts removed;

FIGURE 4 is a fragmentary detail view in side elevation illustrating the discharge and stacking of the cookies on the vibratory feeder troughs design side trailing; and FIGURE 5 is a fragmentary detail diagrammatic view in side elevation illustrating the discharge of the cookies on the vibratory feeder trough design side leading.

Figure 2:
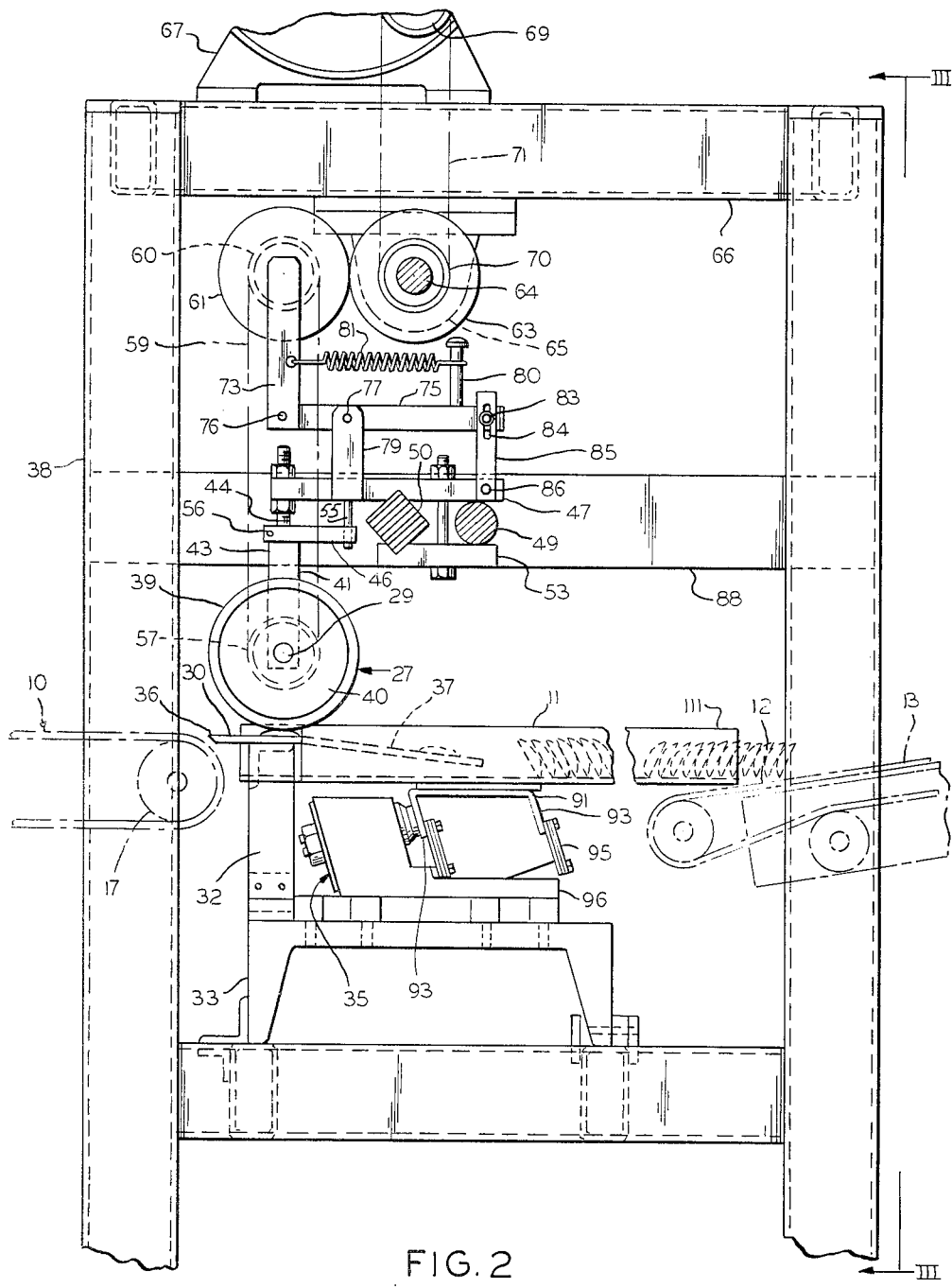
FIGURE 2 is an enlarged detail fragmentary view in side elevation of the inverter mechanism shown in FIGURE 1.

In the embodiment of the invention illustrated in the drawings, we have shown in FIGURES 1 and 2, a conveyor 10 conveying cookies in rows from a converger, such as is shown in the aforementioned Talbot and Rieg application Serial No. 304,035, filed August 23, 1963, and discharging the rows of cookies onto individual vibratory feeder or stacker troughs 11 and 111 having half round bottoms 90 and 90a respectively upending and stacking the cookies by the vibratory motion of the troughs in cooperation with a delivery conveyor 13. The vibratory troughs 11 in turn discharge the stacked cookies onto the inclined receiving end 12 of the delivery conveyor 13, conveying the stacked cookies for packaging or sandwiching.

The conveyor 10 may be a belt conveyor of a type having a flat canvas belt 15 movable between side frame members 16, 16 of a supporting frame structure for the conveyor, and turning about a direction changing idler 17 journalled at its opposite ends in the side frame member 16, 16. The canvas belt 15 changes its direction of travel at the receiving end portions of the vibratory feeder troughs 11 above the bottoms of said troughs to supply rows of cookies thereto.

The canvas belt 15 is shown in FIGURE 1 as having parallel spaced guide strips 19, 19 extending therealong, which may be made from a flexing metal, such as stainless steel. The guide strips 19, 19 are spaced apart distances sufficient to guide a row of cookies between each pair of guide strips and are mounted at their forward ends on the lower end portions of rods 20, 20 extending between spaced bars 21, 21 extending across the conveyor and suitably mounted at their opposite ends in the side frame members 16. The threaded rods depend from the bars 21, 21 and are held in position between said bars 21, 21 as by nuts 22 threaded thereon. The nuts 22 may engage the top and bottom surfaces of the bars 21, 21 and may be locked in position as by lock nuts or the like (not shown).

The conveyor 13 likewise has spaced guide strips 23, 23 extending therealong and mounted at the receiving end of the conveyor beneath spaced bars 24, 24 in a manner similar to which the guide strips 19, 19 are mounted. The guide strips 23, 23 are so spaced as to bring a pair of spaced guide strips in alignment with opposite sides of the discharge end of a vibratory feeder trough 11, and guide the stacked rows of cookies stacked and fed by said troughs to a packaging or sandwiching station.

An inverting mechanism is provided to effect the stacking of certain rows of cookies with one side, which may be the design side, trailing while the same sides of certain other rows of cookies are stacked with the opposite side, which may be the design side leading. This inverting mechanism is shown in FIGURE 2 as including an impelling roll or wheel 27 in association with each row of cookies to be inverted, as stacked in the associated vibratory feeder trough, and engaging the top faces of the cookies and impelling or kicking the cookies onto the half round bottom of an associated vibratory feeder trough to land on the trough on the edge portions thereof beneath leading partially stacked cookies thereon and to thereby be stacked by said vibratory feeder trough in cooperation with the delivery conveyor 13, with the side engaged and impelled by the impelling wheels 27 leading.

Each impelling wheel 27 is rotatable about the axis of a horizontal transverse shaft 29 and is spaced above the receiving end of an associated vibratory feeder trough 11 in centered relation with respect thereto and in vertical alignment with a cookie supporting slide or finger 30, extending from the discharge end of the conveyor belt 15 and along an associated vibratory feeder trough 11 for a portion of the length thereof.

The slides 30 are mounted at their receiving end portions on the vertical legs of angle irons 31, mounted at their opposite ends on upright supports 32 extending upwardly of a stand 33 for vibrators 35, supporting and imparting high frequency vibratory movement to the vibratory troughs 11. Each finger or slide 30 has a horizontal receiving end portion 36, shown in FIGURE 2 as being in alignment with the top surface of the belt 15 and extending from a position closely adjacent said belt beneath an associated vertically spaced impelling wheel 27, and having a downwardly inclined slide portion 37 extending along an associated vibratory feeder trough 11 for a portion of the length thereof. The impelling wheel 27 has a soft periphery spaced above the horizontal surface 36 of the slide 30 a distance sufficient to engage the top surface of the cookie and impel or kick the cookie along the inclined surface of the slide 37 at an increased velocity to be discharged onto the half round bottom of the vibratory feeder trough 11 on its opposite edges, with the side engaged by the impelling wheel 27 facing upwardly.

The impelling wheels 27 are mounted between the side frame members of an upright frame structure 38, extending upwardly along opposite sides of the conveyor 10, and the stacking conveyor 13, and also forming a support for the stand 33 for the vibrators 35. As shown in FIGURE 1, eight rows of cookies are delivered by the conveyor 10, four rows of which are stacked by the respective aligned vibratory feeder troughs 111 design side trailing and four other rows of which each have an impeller wheel spaced thereabove to engage the top surfaces of the cookies and kick or impel the cookies to be discharged onto the half round bottom of the respective vibratory feeder troughs 11 on their opposite edges and be stacked by said vibratory feeder troughs in cooperation with the delivery conveyor 13 in opposite relation with respect to the cookies stacked by the vibratory feeder troughs 111.

Each impelling wheel 27 and its support mounting and drive is the same, so one only need herein be shown and described in detail. The impelling wheel 27 has a relatively soft face which may be in the form of an annular piece of polyurethane foam material 39 mounted on a hub or spider 40, suitably journaled on the shaft 29. The shaft 29 is mounted on and extends outwardly of a vertical leg 41 of a swivel mounting bracket 43. A threaded shaft 44 extends vertically of a horizontal leg 45 of the swivel mounting bracket 43 through a lock bar 46 abutting the top of the horizontal leg 45, and through a vertically spaced clamping bar 47, abutting the top surface of a round support bar 49 and recessed within the top corner of a parallel rectangular support bar 50, and clamped thereto as by a clamping screw 51. The clamping screw 51 extends through a lower clamping bar 53 and is threaded at its upper end in the upper clamping bar 47. Nuts 54, 54 threaded on the threaded shaft 44 and abutting opposite sides of the clamping bar 47 are provided to retain the shaft 44 in position.

The lock bar 46 is mounted at its lower end on a pin 55 depending from the bar 47. The lock bar 46 has a split forward end portion, the split portion of which registers with the apertured portion of said lock bar, through which the threaded shaft 44 extends. A machine screw 56 extends through the split forward end portion of the lock bar 46, and is threaded therein, to bring the split portions of the bar together and clamp said bar to the shaft 44 and hold the swivel mounting bracket 43 in position, to retain the wheels 27 in longitudinally aligned relation with respect to the vibratory feeder troughs 11.

The spider or hub 40 has a pulley 57 connected thereto and engaged by a V-belt 59, trained about a pulley 60, suitably connected with and driven from a drive roller 61 having driving engagement with the face of a drive roller 63. The drive roller 63 has a shaft 64 extending therealong and beyond the opposite ends thereof. Opposite ends of the shaft 64 are mounted in bearing brackets 65, depending from opposite side frame members 66 of the frame structure 69. The drive roller 63 thus forms a drive member for all of the drive rollers 61 in a manner similar to that shown and described in the aforementioned application Serial No. 304,035 of Richard C. Talbot and Fred Rieg. A motor 67, which may be a speed reducer type of motor having the speed reducer contained in a casing extending from the motor casing, is mounted on the tops of the side frame members 66 and has a pulley 69 driven from the speed reducer and driving the roller 63 through a pulley 70 on one end of the shaft 64 and a V-belt 71.

The drive roller 61 is rotatably journalled on the upper end of a tensioning lever 73, pivotally mounted at its lower end on an arm 75 on a pivot pin 76. The arm 75 is pivotally mounted intermediate its end on a pivot pin 77, mounted at its opposite ends between the furcations of a bifurcated upright bracket welded or otherwise secured to opposite sides of the clamping bar 77 and extending upwardly therefrom along opposite sides of the lever arm 75. The lever arm 75 has a connector 80 extending upwardly therefrom on the opposite side of the pivot pin 79 from the pivot pin 76 and having a tension spring 81 connected thereto at one end and connected at its opposite end to the arm 73. The tension spring 81 thus serves to maintain the drive roll 61 into engagement with the face of the drive roller 63 to be driven therefrom.

The lever arm 79 has a pin 83 extending laterally from its rear end portion through a slot 84 in a link 85 pivoted to the clamping bar 47 at its lower end, as by a pivot pin 86. The pin 86 accommodates movement of the lever arm 75 about the axis of the pin 77 to tighten or loosen the belt 59. The pin 83 may be a threaded pin and may have a nut (not shown) threaded thereon to retain the lever arm 75 in position and to retain the belt 59 at the required tension. The bars 49 and 50, supporting the carriages for the impeller wheels 27 are mounted at their opposite ends in side frame members 88 of the frame structure 39 in a conventional manner, which need not herein be shown or described since it forms no part of the present invention.

The respective vibratory feeder troughs 11 and 111 have oppositely inclined side walls 89 and 89a, converging to the half round bottoms 90 and 90a, generally conforming to the shape of the cookies discharged thereon as upended by the reciprocatory movement of said feeder troughs in cooperation with the conveyor 13. The vibratory feeder or stacker troughs 111 are of a similar shape. Each vibratory feeder trough 11 is mounted on a generally U-shaped vibratory driver 91 of the vibratory drive mechanism 35. The drive 91 has parallel depending inclined legs 93 depending from the bottom of the trough 16 and secured at their lower ends to inclined leaf springs 95, mounted at their lower ends on a base 96 for the vibratory drive mechanism. The base 96 is in turn mounted on the stand 33. The troughs 111 are mounted on vibratory drive mechanisms 35 in the same manner the troughs 11 are mounted on said mechanisms and are of the same construction as the troughs 11, but have no impelling wheels associated therewith, nor do they have the slides or fingers 37 extending therealong for a portion of the length thereof.

The vibratory drive mechanisms 35 are like those shown and described in the aforementioned Talbot and Rieg application Serial No. 304,035, and impart high frequency vibratory motion to the drivers 91 and the troughs 11 and 111 as the mechanism is energized to feed the cookies along the troughs 11 and 111 onto the delivery conveyor 13 and to upend the cookies discharged onto said troughs by the vibratory motion of said feeder troughs in cooperation with said delivery conveyor.

As the rows of cookies are delivered by the belt 15 design side up, half of the rows of cookies will drop directly onto the vibratory feeder troughs 111, and when landing on said troughs will drop on the next advance cookie and pivot thereabout to be stacked with the design side trailing. As the cookies drop, the vibratory movement of the feeder troughs in cooperation with the delivery conveyor 13 will also pivot or raise the cookies about their rear or trailing edges to travel along the troughs 111 design side trailing, as shown in FIGURES 2 and 4.

The other half of the rows of cookies will pass under the impelling wheels 27 and will be impelled thereby along the slides or guide fingers 30. The impelling wheels 27 traveling at a substantially higher rate of speed than the belts 15, will kick the cookies along the slides 30 onto the vibratory troughs 11 with a kicking action and on opposite sides of the half round bottom of the trough on their opposite edges, with the result that the cookies landing on vibratory troughs will pass underneath the next advance cookies with the design sides facing upwardly and will be upended by the vibratory motion of said troughs and will be stacked by the vibratory conveying motion of said troughs in cooperation with the elevating conveyor 13, design side leading.

It may be seen from the foregoing that an extremely simple apparatus has been provided for stacking cookies, with half of the rows of cookies design side trailing and the remaining rows of cookies design side leading, and that the inverting of the cookies is attained by the simple action of impelling the cookies as discharged from the conveyor with a kicking action, and accelerating the cookies as they drop onto the vibratory troughs with sufficient speed that they will pass beneath the next advance cookies on said troughs design side up, and will be raised by the vibratory action of said troughs in cooperation with the delivery conveyor 13, design side leading.

While we have herein shown and described one form in which our invention may be embodied, it may readily be understood that various variations and modifications in the invention may be attained without departing from the spirit and scope of the novel concepts thereof.

We claim as our invention:

1. In an apparatus of the class described,
a flat cookie conveyor,
a vibratory feeder trough in cookie receiving relation with respect to said conveyor and having a half round bottom,
a delivery conveyor at the discharge end of said feeder trough,
a slide forming a continuation of said cookie conveyor and having a downwardly inclined portion extending along said trough for a portion of the length thereof,
and impelling means spaced above and in alignment with said slide for successively engaging the top faces of the cookies discharged from said conveyor and impelling the cookies onto said vibratory feeder trough with sufficient velocity to land on their edges on opposite rounded side walls of said vibratory feeder trough beneath a leading cookie, to be stacked by the vibratory action of said feeder trough in cooperation with said delivery conveyor, with the side facing upwardly on said flat conveyor facing in a leading direction.

2. In an apparatus of the class described,
a flat cookie conveyor,
a vibratory feeder trough in cookie receiving relation with respect to said flat conveyor and having a half round bottom,
a slide having a horizontal portion forming a continuation of said cookie conveyor and a downwardly inclined portion extending therefrom along said feeder trough for a portion of the length thereof,
a delivery conveyor at the discharge end of said feeder trough,
and impelling means spaced above the portion of said slide forming a continuation of said flat conveyor comprising,
a rotatably driven impelling wheel having a soft face engageable with the top surface of a cookie delivered by said flat conveyor along said slide and rotatable about an axis extending transversely of said flat conveyor for successively impelling cookies to be deposited on their edges on opposite sides of the side walls of said half round bottom of said vibratory feeder trough, with the side which was up on said conveyor facing upwardly on said vibratory feeder trough and impelled to pass beneath a next leading cookie on said vibratory feeder trough to be stacked by the vibratory action of said delivery trough in cooperation with said conveyor.

3. In an apparatus of the class described,
a flat cookie conveyor,
a vibratory feeder trough in cookie receiving relation with respect to said conveyor and having a half round bottom,
a delivery conveyor at the discharge end of said feeder trough,
a slide having a horizontal surface forming a continuation of the top surface of said flat cookie conveyor and extending along said feeder trough in a downwardly inclined direction and terminating intermediate the ends of said feeder trough in spaced relation with respect to the bottom thereof,
an impelling wheel spaced above and in alignment with said slide,
said impelling wheel having a soft periphery engaging the top surfaces of cookies delivered to said slide and impelling the cookies along said slide to be delivered onto said rounded bottom of said vibratory feeder trough at opposite edges of the cookies beneath a next advance cookie on said vibratory feeder trough with the side thereof engaged by said impelling wheel facing upwardly, to be stacked by the vibratory action of said feeder trough in cooperation with said delivery conveyor.

4. In an apparatus of the class described,
a cookie conveyor,
a series of vibratory feeder troughs arranged in side by side relation with respect to each other and in cookie receiving relation with respect to said cookie conveyor,
each feeder trough having a half round bottom and opposite flaring side walls extending upwardly therefrom and each feeder trough being in cookie receiving relation with respect to a row of cookies on said cookie conveyor,
an upwardly inclined delivery conveyor in cookie receiving relation with respect to said feeder troughs,
slides spaced above certain of said feeder troughs and forming continuations of said cookie conveyor and having downwardly inclined portions extending along said troughs for portions of the lengths thereof,
impelling wheels spaced above said slides and engageable with the top surfaces of successive cookies conveyed thereon by said cookie conveyor and impelling the cookies to land on their opposite edges on the rounded side walls of the associated vibratory feeder troughs beneath next advance partially upended cookies, to be stacked with the sides thereof, engaged by said impelling wheels facing in the direction of travel of the cookies, by the vibratory action of said feeder troughs in cooperation with said delivery conveyor.

5. In an apparatus of the class described,
a cookie conveyor, conveying cookies in rows,
a series of side by side vibratory feeder troughs in cookie receiving relation with respect to the rows of cookies on said cookie conveyor,
a delivery conveyor at the discharge ends of said troughs,
certain of the cookies dropping directly from said conveyor onto opposite sides of the rounded bottoms of said vibratory feeder troughs with the top surfaces thereof facing the bottoms of said vibratory feeder troughs,
slides forming continuations of said cookie conveyor and extending along certain other of said vibratory feeder troughs for portions of the lengths thereof and inclined downwardly along said troughs and terminating in vertically spaced relation with respect to the bottoms of said troughs,
and a rotatably driven impeller wheel spaced above each slide and having a soft impelling surface engageable with the top face of a cookie and effective to impel the cookies along said slides with sufficient velocity to land on their opposite edges on opposite rounded sides of said troughs, with the sides thereof engaged by said impelling wheel facing upwardly, partially beneath a next advance upended cookie, to be upended by the vibratory action of said feeder trough in cooperation with said delivery conveyor with the side of the cookie engaged by the impelling wheel leading.

6. In an apparatus of the class described,
a flat cookie conveyor having a plurality of side by side rows of cookies thereon,
a vibratory feeder trough in cookie receiving relation with respect to each row of cookies,
each vibratory feeder trough having a half rounded bottom and opposite flaring side walls, and the bottom surface of the half rounded bottoms thereof being spaced beneath the material carrying surface of said flat belt conveyor,
means for vibrating said feeder troughs at high frequency vibrations,
an elevating conveyor in cookie receiving relation with respect to said vibratory feeder troughs and cooperating therewith to effect stacking of the cookies on said vibratory feeder troughs by the vibratory action thereof,
said flat belt conveyor discharging certain rows of cookies directly onto certain of said vibratory feeder troughs, to be stacked thereby in cooperation with said elevating conveyor with the faces facing upwardly on said flat belt conveyor trailing,
and means for effecting the stacking of certain of other of the rows of cookies with the sides thereof facing upwardly on said flat belt conveyor leading, comprising
slides extending along and inclined downwardly with respect to certain of said vibratory feeder troughs and terminating intermediate the ends of said troughs and above the bottoms thereof,
a soft faced impelling wheel spaced above each slide and mounted for rotation about a horizontal axis extending transversely of said slide,
a motor,
and means driven by said motor for driving said impelling wheels at a higher peripheral velocity than the linear speed of travel of said flat belt conveyor, to accelerate the cookies passing onto said slides with sufficient velocity to pass along said slides and engage opposite flaring sides of said feeder troughs on the opposite edges of said cookies and pass beneath a leading upended cookie, with the side thereof engaged by said impelling wheel facing upwardly, to be stacked by the vibratory action of said vibratory feeder troughs in cooperation with said elevating conveyor, with the top faces of the cookies leading.

References Cited by the Examiner
UNITED STATES PATENTS

| | | | |
|---|---|---|---|
| 2,519,491 | 8/1950 | Monaco | 198—35 |
| 2,555,602 | 6/1951 | Nutt | 198—30 |

HUGO O. SCHULZ, *Primary Examiner.*

RICHARD E. AEGERTER, SAMUEL F. COLEMAN,
*Examiners.*